United States Patent
Yu et al.

(10) Patent No.: US 8,217,592 B2
(45) Date of Patent: Jul. 10, 2012

(54) LIGHT EMITTING DIODE DRIVING DEVICE AND DRIVING METHOD THEREOF

(75) Inventors: Ching-Chou Yu, Hsin-Chu (TW); Hung-Ching Lee, Hsin-Chu (TW); Po-Tang Hsu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 302 days.

(21) Appl. No.: 12/621,775

(22) Filed: Nov. 19, 2009

(65) Prior Publication Data
US 2010/0201282 A1 Aug. 12, 2010

(30) Foreign Application Priority Data
Feb. 6, 2009 (TW) .............................. 98103943 A

(51) Int. Cl.
*H05B 37/02* (2006.01)

(52) U.S. Cl. ...................... 315/307; 315/185 R; 315/287

(58) Field of Classification Search .................. 315/247, 315/287, 297, 307–308, 360, 185 R, 291
See application file for complete search history.

(56) References Cited

U.S. PATENT DOCUMENTS

| 7,265,504 | B2 * | 9/2007 | Grant et al. | 315/308 |
|---|---|---|---|---|
| 7,928,670 | B2 * | 4/2011 | Chen et al. | 315/308 |
| 2003/0117087 | A1 * | 6/2003 | Barth et al. | 315/291 |
| 2006/0103612 | A1 * | 5/2006 | Ozaki | 345/83 |
| 2008/0224636 | A1 * | 9/2008 | Melanson | 315/307 |
| 2009/0001253 | A1 * | 1/2009 | Blaut et al. | 250/205 |
| 2011/0115394 | A1 * | 5/2011 | Shteynberg et al. | 315/250 |

FOREIGN PATENT DOCUMENTS
JP 2005-252211 A 9/2005
* cited by examiner

*Primary Examiner* — Tung X Le
(74) *Attorney, Agent, or Firm* — Rabin & Berdo, P.C.

(57) ABSTRACT

A light emitting diode driving device and driving method thereof are provided. The light emitting diode driving device includes a duty cycle setup unit, a current setup unit, a control unit, and a light emitting diode driving circuit. The duty cycle setup unit is used for outputting duty cycle setup signal. The current set up unit is used for outputting a current setup signal. The control unit is used for receiving the duty cycle setup signal and the current setup signal, and outputting a current control signal and a duty cycle control signal in response to the duty cycle setup signal and the current setup signal. The light emitting diode driving circuit is used for driving at least one light emitting diode in response to the current control signal and the duty cycle control signal.

12 Claims, 2 Drawing Sheets

LIGHT EMITTING DIODE DRIVING DEVICE AND DRIVING METHOD THEREOF

This application claims the benefit of Taiwan Patent Applications, Serial No. 98103943, filed Feb. 6, 2009, the subject matter of which is incorporated herein by reference.

BACKGROUND OF THE INVENTION

1. Field of the Invention

The present invention is directed to a light emitting diode driving device and a driving method thereof, and in particular to a light emitting diode device for use in a display and a driving method thereof.

2. Description of the Related Art

Because of the good characteristics of light emitting diodes (LEDs) such as low power consumption and low operating temperature, LEDs have been widely used in various applications.

For example, many small size panels use LEDs connected in series as backlights. Many backlights of cell phones or personal digital assistants (PDAs) also use LEDs for illumination. In addition, owing to the halgon free requirement of the European League, the new generation of LED driving devices and driving methods is needed.

Backlights of many portable products have a backlight adjusting function. That is, in some conditions such as in certain circumstances without outer power supply, illumination of backlights is adjustable to decrease the power consumption to increase the lifetime of batteries. However, current LED driving methods have following disadvantages:

The driving current flowing through LEDs is fixed and not adjustable with various conditions. Since the amount of the driving current determines the luminance, current-fixing driving scheme further limits the convenience in different applications.

The driving current is fixed to the current of maximum luminance. Driving LEDs by the maximum luminance current in all conditions makes LEDs operate in a lower efficiency region.

Since current LED driving methods have the deficiencies above, an improved LED driving method is needed.

SUMMARY OF THE INVENTION

It is therefore an object of the invention to provide a light emitting diode driving device having higher driving efficiency and a driving method thereof.

According to an object of the present invention, a device for driving a light emitting diode is provided. The light emitting diode driving device comprises a duty cycle setting up unit, a current setting up unit, a control unit, and a light emitting diode driving circuit. The duty cycle setting up unit is adapted to output a duty cycle setting up signal. The current setting up unit is adapted to output a current setting up signal. The control unit is adapted to receive the duty cycle setting up signal and the current setting up signal, and output a current signal and a duty cycle control signal in response to the duty cycle setting up signal and the current setting up signal. The light emitting diode driving circuit is adapted to drive a light emitting diode in response to the current control signal and the duty cycle control signal.

According to another object of the present invention, a method for driving a liquid emitting diode is provided. The light emitting diode driving method comprises: providing a first driving current for driving a light emitting diode during a first period of time, the first driving current having a first duty cycle and a first current value, and providing a second driving current for driving the light emitting diode during a second period of time subsequent to the first period of time, the second driving current having a second duty cycle and a second current value, wherein the first current value is different from the second current value and the first duty cycle is different from the second duty cycle.

According to still another object of the present invention, another method for driving a liquid emitting diode is provided. The light emitting diode driving method comprises providing a duty cycle setting up signal; providing a current setting up signal; transferring the duty cycle setting up signal and the current setting up signal to a control unit; outputting a current control signal and a duty cycle control signal to a light emitting diode driving circuit through the control unit; and driving a light emitting diode in response to the current control signal and the duty cycle control signal.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
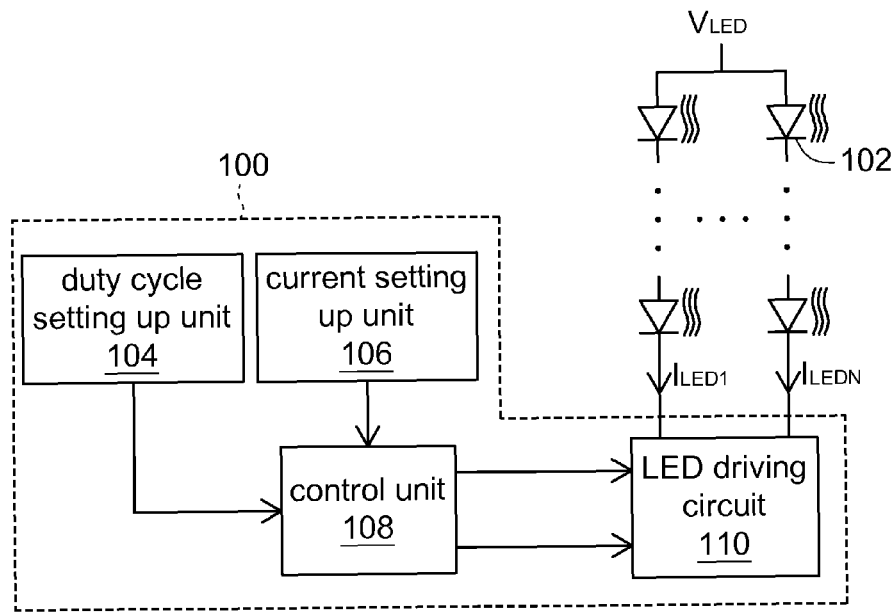
FIG. 1 shows the system block diagram of the light emitting diode driving device according to one of the present embodiments.

Referring to FIG. 1 showing a system block diagram of LED driving device according to one embodiment of the present invention. The LED driving device 100 is adapted to drive LED 102, wherein LED driving device 100 includes duty cycle setting up unit 104, current setting up unit 106 for outputting a current setting up signal, control unit 108, and LED driving circuit 110. Duty cycle setting up unit 104 is adapted to output a duty cycle setting up signal to control unit 108; control unit 108 outputs a current control signal and a duty cycle control signal to LED driving circuit 110 in response to the received duty cycle setting up signal and the received current setting up signal; LED driving circuit 110 drives the LED in response to the current control signal and the duty cycle control signal.

Figure 2A:
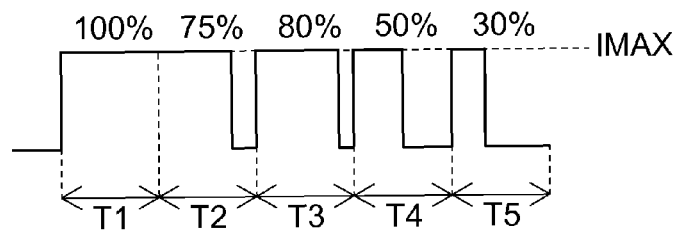
FIG. 2A and FIG. 2B respectively show the receiving and outputting waveforms of the light emitting diode driving device according to one of the present embodiments.
Figure 2B:
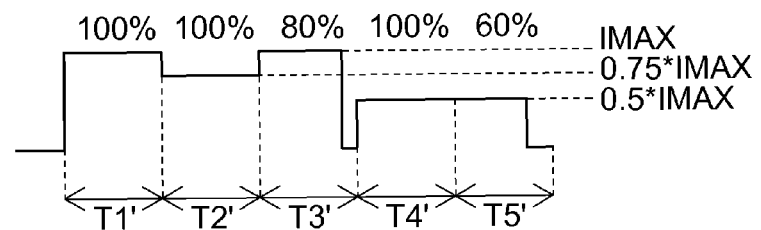

Refer to FIG. 2A and FIG. 2B. FIG. 2A shows the waveform diagram of the duty cycle setting up signal being received by the control unit of the LED driving device. The duty cycle setting up signal could be a pulse width modulation (PWM) signal, voltage, digital signal, and so on. In the embodiment, PWM signal is taken for example. Refer to FIG. 2B, which shows the waveform diagram of the duty cycle setting up signal outputted by the control unit of the LED driving device. In the waveform diagram of FIG. 2B, the set-up levels of the output current is 4, that is, the value of the output current could be maximum output current IMAX, 0.75 IMAX, 0.5 IMAX, or 0.25 IMAX. In FIG. 2A and FIG. 2B, the horizontal axis represents time axis and the vertical axis represents the current value. Refer to FIG. 2A, during the time period T1, the duty cycle of the PWM signal being supplied from the duty cycle setting up unit 104 to the control unit 108 is 100%; the maximum current being supplied from the current setting up unit to the control unit is IMAX. During the time period T2, the duty cycle of the PWM signal being supplied from the duty cycle setting up unit 104 to the control unit 108 is 75%; the maximum current being supplied from the current setting up unit to the control unit is IMAX. During the time period T3, the duty cycle of the PWM signal being supplied from the duty cycle setting up unit 104 to the control unit 108 is 85%; the maximum current being supplied from the current setting up unit to the control unit is IMAX. During the time period T4, the duty cycle of the PWM signal being supplied from the duty cycle setting up unit 104 to the control unit 108 is 50%; the maximum current being supplied from the current setting up unit to the control unit is IMAX. During the time period T5, the duty cycle of the PWM signal being supplied from the duty cycle setting up unit 104 to the control unit 108 is 30%; the maximum current being supplied from the current setting up unit to the control unit is IMAX.

Refer to FIG. 2B, during the time period T1', the duty cycle of the PWM signal being supplied from the control unit 108 to the LED driving unit 110 is 100%; the current being supplied from the control unit 108 to the LED driving unit 110 is IMAX. During the time period T2', the duty cycle of the PWM signal being supplied from the control unit 108 to the LED driving unit 110 is 100%; the current being supplied from the control unit 108 to the LED driving unit 110 is 0.75IMAX. During the time period T3', the duty cycle of the PWM signal being supplied from the control unit 108 to the LED driving unit 110 is 85%; the current being supplied from the control unit 108 to the LED driving unit 110 is IMAX. During the time period T4', the duty cycle of the PWM signal being supplied from the control unit 108 to the LED driving unit 110 is 100%; the current being supplied from the control unit 108 to the LED driving unit 110 is 0.5IMAX. During the time period T5', the duty cycle of the PWM signal being supplied from the control unit 108 to the LED driving unit 110 is 60%; the current being supplied from the control unit 108 to the LED driving unit 110 is 0.5IMAX. It is noted that the duty cycle and current received by the control unit 108 can be equal to or different than the duty cycle and current outputted by the control unit 108. For example, during the time period T2, the duty cycle and current received by the control unit 108 are respectively 75% and IMAX, and they are different from the duty cycle and current outputted by the control unit 108 that are respectively 100% and 0.75IMAX. The duty cycles and current received and outputted by the control unit 108 has the relationship:

Duty cycle of the signal received*current of the signal received=duty of the signal outputted*current of the signal outputted    equation (1)

By adaptively adjusting the outputted duty cycle and the outputted current, LEDs can properly operate in the high efficiency region. Besides, by adjusting the current set up value the efficiency can be increased, and by adjusting the pulse width the average current flowing through the LEDs can be accurately controlled.

Figure 3:
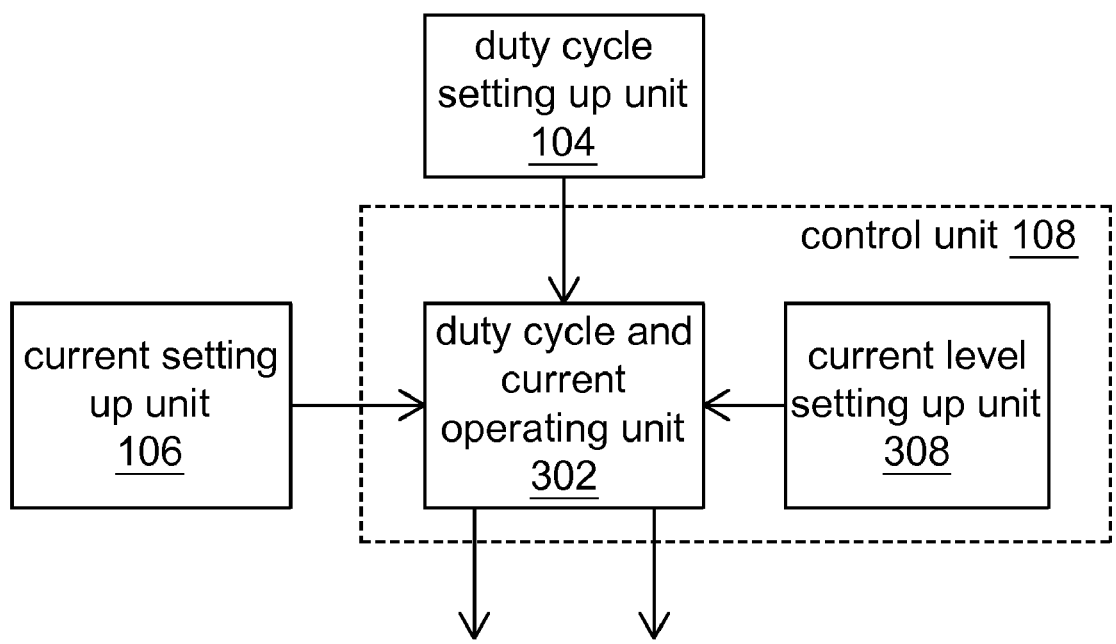
FIG. 3 shows the system block diagram of the control unit of the light emitting diode driving device according to one of the present embodiments.

Refer to FIG. 3 showing a system block diagram of the control unit 108 of a LED driving device according to one of the embodiments. The control unit 108 includes a current level setting up unit 308 for determining a current level, and a duty cycle and current operating unit 302 for outputting a current control signal and a duty cycle signal in response to the maximum current value determined by the current setting up unit 106, the current level determined by the current level setting up unit 308, and the duty cycle setting up signal determined by the duty cycle setting up unit 104. The current level setting up unit 308 is able to set up the current level being outputted from the LED driving circuit 110 according to the actual demand. Here 4 levels (1~4) are taken for example to describe the operation of duty cycle and current operating unit 302. When the duty cycle setting up signal received by the control unit 108 represents 0%<=duty cycle<=25%, the current level is set to 1, and the current control signal is set to a value that indicates the LED driving circuit to output the current value of ¼*IMAX, wherein IMAX is the maximum current value. When the duty cycle setting up signal received represents 25%<duty cycle<=50%, the current level is set to 2, and the current control signal is set to a value that indicates the LED driving circuit to output the current value 2*¼*IMAX=½ IMAX. When the duty cycle setting up signal received represents 50%<duty cycle<=75%, the current level is set to 3, and the current control signal is set to a value that indicates the LED driving circuit to output the current value of ¾*IMAX. When the duty cycle setting up signal received represents 75%<duty cycle<=100%, the current level is set to 4, and the current control signal is set to a value that indicates the LED driving circuit to output the current value of IMAX. For example, when the duty cycle setting up signal being received represents a duty cycle of 80%, the current level is set to 4 and the current control signal is set to a value that indicates the LED driving circuit to output the current value of 4*¼IMAX=IMAX. According to equation (1), the duty cycle control signal is set to 80%. For example, when the duty cycle setting up signal being received represents a duty cycle of 25%, the current level is set to 1 and the current control signal is set to a value that indicates the LED driving circuit to output the current value of 1*¼IMAX=0.25 IMAX. According to equation (1), the duty cycle control signal is set to a value that indicates the LED driving circuit to output the duty cycle of 100%. It is noted that the current level can be arbitrarily selected according to actual demand and not limited to the embodiments.

Referring to FIG. 1 and FIG. 2B, during the time period T2' and T3', the light emitting diode driving device 100 supplies a first driving current during the time period T2' for driving the light emitting diodes 102. The first driving current is with a 100% duty cycle and a 0.75 IMAX current value. During the time period T3' subsequent to the time period T2', the light emitting diode driving device 100 supplies a second driving current for driving the light emitting diodes 102. The second driving current is with a 80% duty cycle and a IMAX current value. During the time period T2' and T3', the duty cycle of the first driving current is larger than that of the second driving current; the current value of the first driving current is smaller than that of the second driving current.

During the time period T3' and T4', the light emitting diode driving device 100 supplies a second driving current during the time period T3' for driving the light emitting diodes 102. The second driving current is with a 80% duty cycle and a IMAX current value. During the time period T4' subsequent to the time period T3', the light emitting diode driving device 100 supplies a third driving current for driving the light emitting diodes 102. The third driving current is with a 100% duty cycle and a 0.5 IMAX current value. During the time period T3' and T4', the duty cycle of the second driving current is smaller than that of the third driving current; the current value of the second driving current is larger than that of the second driving current.

According to the light emitting diode driving device and the driving method thereof mentioned above, the current value and duty cycle of the light emitting diode driving current can be effectively adjusted so that the efficiency of the light emitting diode can be increased and the average conduction current of the light emitting diodes can be precisely controlled.

While the invention has been described by way of example and in terms of the preferred embodiments, it is to be understood that the invention is not limited to the disclosed embodiments. Rather, it is intended to cover various modifications and similar arrangements and procedures, and the scope of the appended claims therefore should be accorded the broadest interpretation so as to encompass all such modifications and similar arrangements and procedures.

What is claimed is:

1. A light emitting diode driving device comprising:
   a duty cycle setting up unit for outputting a duty cycle setting up signal;
   a current setting up unit for outputting a current setting up signal;
   a control unit for receiving the duty cycle setting up signal and the current setting up signal and outputting a current control signal and a duty cycle control signal in response to the duty cycle setting up signal and the current setting up signal; and
   a light emitting diode driving circuit for driving a light emitting diode in response to the current control signal and the duty cycle control signal;
   wherein the control unit includes: a current level setting up unit for determining a current level, and a duty cycle and current operating unit for outputting the current control signal and the duty cycle control signal in response to a maximum current value and the current level.

2. The light emitting diode driving device of claim 1, wherein the current setting up signal is used for setting up the maximum current value outputted by the control unit.

3. The light emitting diode driving device of claim 1, wherein the duty cycle setting up signal comprises information of a duty cycle of a current received by the control unit.

4. The light emitting diode driving device of claim 1, wherein a product of a duty cycle represented by the duty cycle control signal and the current control signal is equal to a product of a duty cycle of the duty cycle setting up signal and the current setting up signal.

5. A light emitting diode driving method comprising:
   determining a first driving current according to a first input current and providing the first driving current for driving a light emitting diode during a first period of time, the first input current having a first input duty cycle and a first input current value and the first driving current having a first driving duty cycle and a first driving current value, wherein a product of the first driving duty cycle and the first driving current value is determined according to a product of the first input duty cycle and the first input current value; and
   determining a second driving current according to a second input current and providing the second driving current for driving the light emitting diode during a second period of time subsequent to the first period of time, the second input current having a second input duty cycle and a second input current value and the second driving current having a second driving duty cycle and a second driving current value, wherein a product of the second driving duty cycle and the second driving current value is determined according to a product of the second input duty cycle and the second input current value.

6. The light emitting diode driving method of claim 5, wherein the first driving current value is larger or smaller than the second driving current value.

7. The light emitting diode driving method of claim 5, wherein the product of the first driving duty cycle and the first driving current value is equal to the product of the first input duty cycle and the first input current value.

8. The light emitting diode driving method of claim 7, wherein the product of the second driving duty cycle and the second driving current value is equal to the product of the second input duty cycle and the second input current value.

9. The light emitting diode driving method of claim 5, wherein the first driving duty cycle is smaller or larger than the second driving duty cycle.

10. A light emitting diode driving method comprising:
    providing a duty cycle setting up signal;
    providing a current setting up signal;
    transferring the duty cycle setting up signal and the current setting up signal to a control unit;
    determining a current level in response to the duty cycle setting up signal;
    determining a current control signal in response to the current level and a maximum current value;
    determining a duty cycle control signal in response to the current control signal, the duty cycle setting up signal and the current setting up signal;
    outputting the current control signal and the duty cycle control signal to a light emitting diode driving circuit through the control unit; and
    driving a light emitting diode in response to the current control signal and the duty cycle control signal.

11. The light emitting diode driving method of claim 10, wherein the step of driving a light emitting diode further comprises:
    providing a first driving current to drive the light emitting diode during a first period of time; and
    providing a second driving current to drive the light emitting diode during a second period of time subsequent to the first period of time.

12. The light emitting diode driving method of claim 11, wherein a product of a duty cycle represented by the duty cycle control signal and the current control signal is equal to a product of a duty cycle of the duty cycle setting up signal and the current setting up signal.

* * * * *